United States Patent [19]

Witt et al.

[11] 4,015,406
[45] Apr. 5, 1977

[54] LAWNMOWER BAGGING APPARATUS

[75] Inventors: Robert H. Witt, Bloomington;
Herbert F. Horner, Jr., Tonka Bay;
Richard A. Thorud, Bloomington, all
of Minn.

[73] Assignee: The Toro Company, Minneapolis, Minn.

[22] Filed: Aug. 4, 1975

[21] Appl. No.: 601,443

[52] U.S. Cl. .................................................. 56/202
[51] Int. Cl.² ........................................ A01D 35/22
[58] Field of Search ................ 56/202, 203, 320.2, 56/17.4

[56] References Cited
UNITED STATES PATENTS

| 3,757,503 | 9/1973 | Soldavini | 56/202 |
| 3,837,157 | 9/1974 | Van Der Lely | 56/202 |

OTHER PUBLICATIONS

The Toro Guide to Lawns and Mowers; The Toro Company; 1974; pp. 2,3,12,13 and 14.

Primary Examiner—Louis G. Mancene
Assistant Examiner—James D. Hamilton
Attorney, Agent, or Firm—Merchant, Gould, Smith, Edell, Welter & Schmidt

[57] ABSTRACT

Collection or bagging apparatus for a riding-type lawn mower is disclosed. A substantially rigid top hinged receptacle structure is fastened to the mower frame. A telescoping elongated handle member which cooperates with a bracket to provide a retractable lever for emptying of the receptacle and a latch to prevent accidental opening of the receptacle during the filling procedure is provided.

12 Claims, 6 Drawing Figures

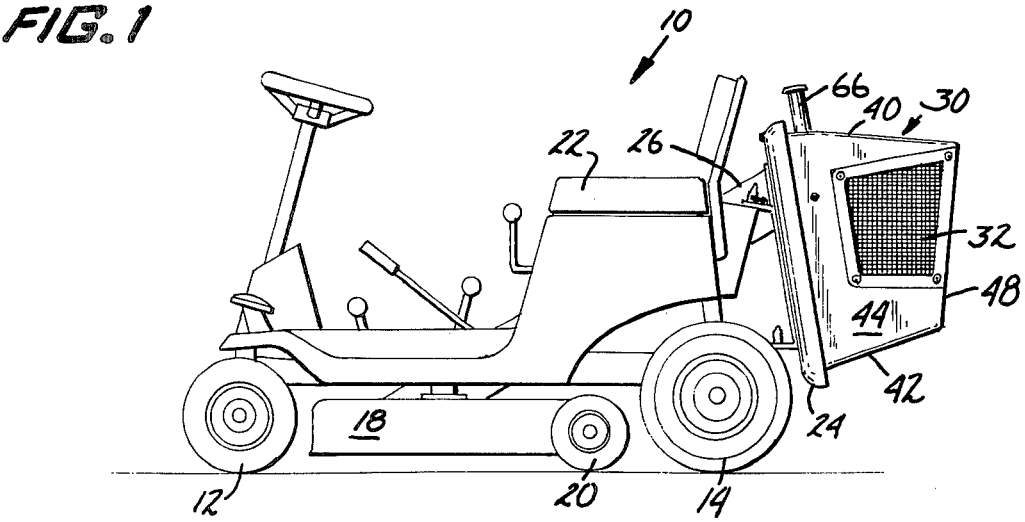
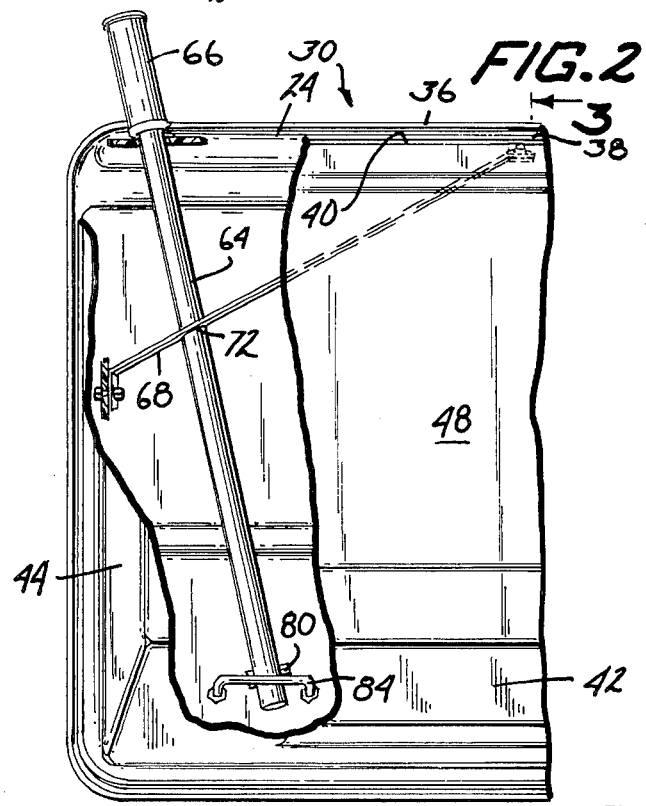
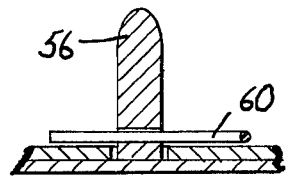
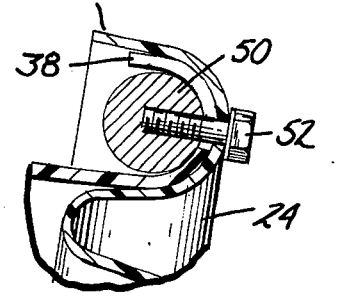
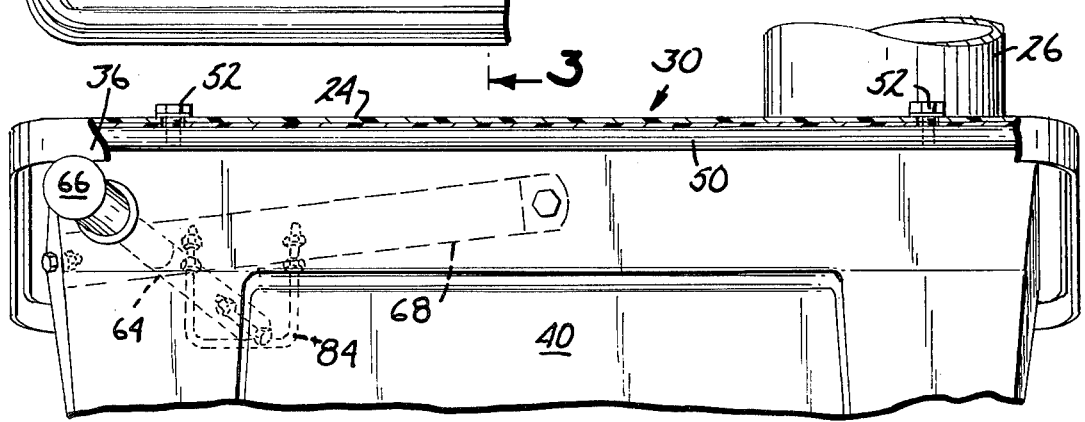

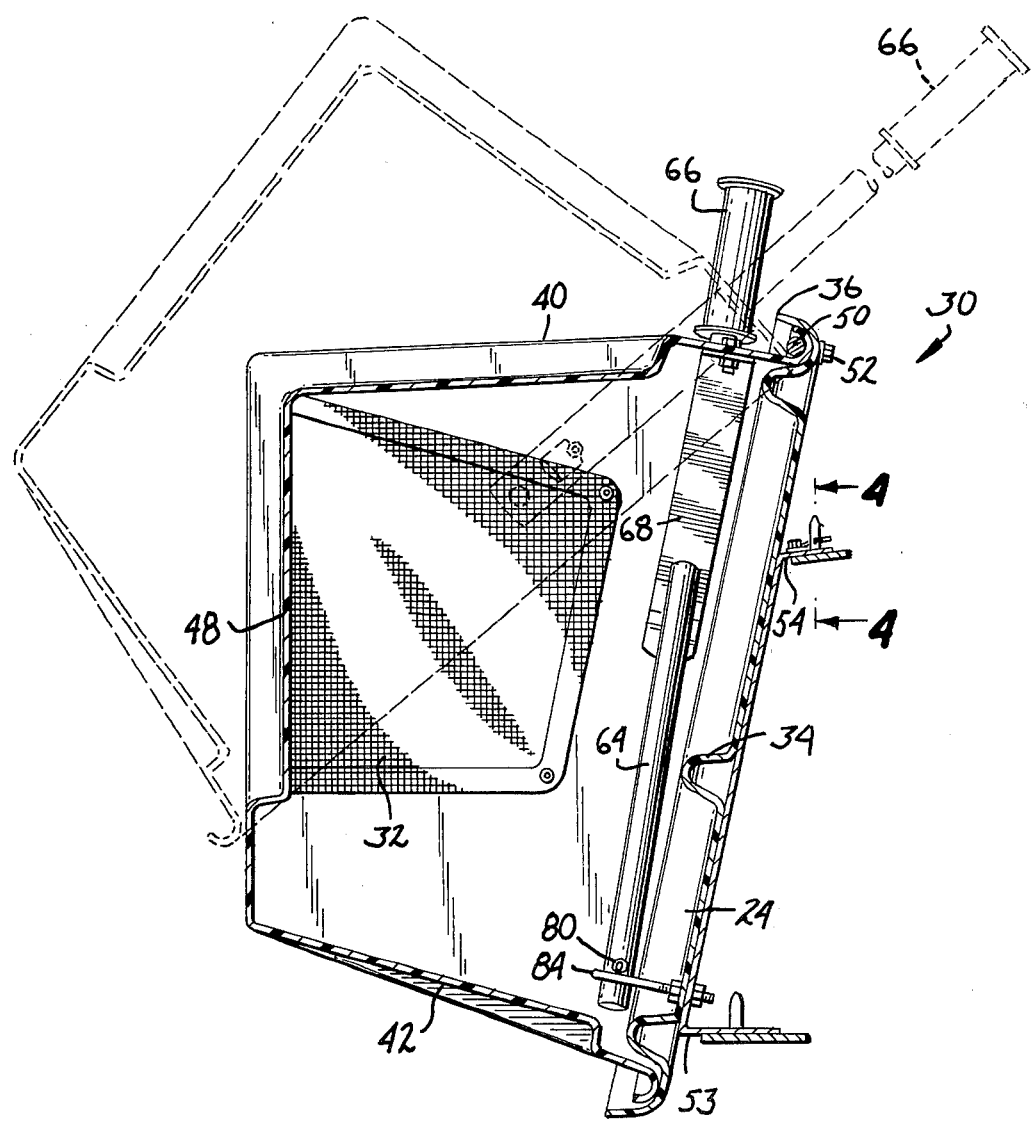

LAWNMOWER BAGGING APPARATUS

BACKGROUND OF THE INVENTION

This invention relates generally to lawn and garden implements of the type in which vegetation is harvested, then transported to and collected in a receptacle which is periodically emptied. More particularly, the invention concerns improved collection and emptying apparatus particularly suited to use with an implement in which the operator rides on the implement during the harvesting operation.

A common drawback of cut vegetation collection apparatus used with riding-type harvesters is that the operator must leave his position at an operator chair to periodically empty thee collection receptacle. Structure which requires this additional effort is time consuming and relatively inconvenient. It is much more desirable to have an implement which can be emptied by an operator without leaving his position at an operator chair or other control position on the implement. In addition, it is advantageous to provide a compact and easily operable collection and emptying receptacle with a minimum number of parts capable of easy fabrication.

U.S. Pat. Nos. 3,493,987 to Longecker and 3,753,340 to Mathews are illustrative of prior art lawn mower collecting and emptying receptacles. These patents show a top hinged collecting receptacle. However, the present invention has a number of important advantages over these receptacle systems. First, the present invention provides an extensible handle member which effectively functions as an accessible lever for use by an operator in emptying the receptacle. In its retracted position, the handle member cooperates with other elements of the present invention to provide a latch function for the receptacle. The advangtages in operation associated with such structure will be apparent. With such structure the operator can unlatch and empty the receptacle in a simple operation with little effort.

SUMMARY OF THE INVENTION

In accordance with the invention, collecting and unloading apparatus for a lawn and garden implement which harvests vegetation is provided. The collecting and unloading apparatus includes a receptacle of substantial structural rigidity which is hingedly fastened to a base on the implement to form an enclosure which may be emptied by pivoting the receptacle about its hinged connection. An elongated handle member is carried by the receptacle and so mounted that it is movable from a retracted position in which only a portion of the handle extends beyond said basket to an extended position in which the handle provides an effective lever for use by an operator in pivoting the receptacle for emptying. A bracket is carried by the frame of the implement and engages the handle member when the handle member is in its retracted position, thereby preventing pivotal movement of the receptacle and effectively latching the receptacle into a closed position.

In certain embodiments of the invention, the handle member is telescopically received by means of a pair of aligned apertures, one each in the wall of the receptacle and in a structural brace member mounted within the receptacle, and the bracket is a U-shaped member aligned with the axis defined by the handle member's telescopic movement to receive one end thereof to prevent pivotal movement of the basket when the handle is in a fully retracted position.

BRIEF DESCRIPTION OF THE DRAWINGS

Additional features and advantages of the invention will become apparent upon reading the following detailed description and upon reference to the drawings. Referring particularly to the drawings, wherein the use of like reference numerals throughout the several views indicates like elements:

FIG. 1 is a view in side elevation of a riding-type lawn and garden implement incorporating a particular embodiment of the present invention;

FIG. 2 is a fragmentary elevational view of the structure shown in FIG. 1 with portions cut away to reveal the structure of the handle and latch mechanism;

FIG. 3 is a sectional view of the structure of FIG. 2 taken generally along the line 3—3 with an emptying position of the apparatus being shown in phantom;

FIG. 4 is a sectional view taken along the line 4—3 of FIG. 3 illustrating one means of mounting the receptacle;

FIG. 5 is a plan view of the apparatus illustrating important features thereof, portions thereof being broken away and shown in phantom to further illustrate the pivot handle and latch mechanism;

FIG. 6 is an enlarged sectional view of a hinge structure suitable for use with the present invention.

While the invention will be described in connection with the preferred embodiment, the invention is not limited in scope to that embodiment. On the contrary, all alternatives, modifications and equivalents included within the spirit and scope of the invention as defined by its claims are covered.

DETAILED DESCRIPTION OF THE INVENTION

Shown in FIG. 1 in side elevation is a riding-type lawn mower with means for collecting cut vegetation. While the invention will be described in connection with a riding-type lawn mower, it would be equally adaptable to any lawn and garden implement in which vegetation is harvested, transported and stored for subsequent emptying. The specific structure shown in the figures merely illustrates one application of the invention so that a concrete example will be provided. Riding-type mower 10 is supported by means of ground-engaging wheels 12 and 14 attached to a main frame 16. Also supported above the ground surface by the main frame 16 is a cutting element mounted for rotation about a substantially vertical axis (not shown) enclosed within a cutting element housing 18. Cutting element housing 18 includes a support wheel 20.

Riding-type mower 10 is provided with an operator chair 22 so that an operator may ride and control the mowing operation in comfort. Various control levers with pedals and a steering wheel are shown on mower 10 in FIG. 1. As these are not essential to operation of the invention, their specific functions and operation will not be discussed here. Connected between cutter housing 18 and a concave base member 24 is a discharge chute 26 of conventional construction. By means of pneumatic transport created by the rotary cutting element, clipped vegetation particles are transported through the discharge chute to a discharge aperture in base 24. Hingedly fastened to base 24 along a top edge thereof is a receptacle 30. Receptacle 30 is of a substantially rigid configuration so that it may be pivoted about its hinged connection while substantially maintaining its shape. In one specific embodiment of the invention which has been constructed, receptacle 30 was constructed of a substantially rigid molded plastic material.

In the construction shown in the figures, receptacle 30 is vented by means of screen portions 32 fastened into openings in the structure to allow discharge of air driven into the receptacle through the discharge chute by the cutting element. Alternatively, receptacle 30 might be constructed by fastening woven fabric over a wire frame hingedly attached to the base 24. As shown more particularly in FIG. 3, base 24 is generally planar with a plurality of reinforcing ridges 34. In the specific embodiment shown base 24 is mounted on main frame 16 at an acute angle to the vertical. By such construction, when receptacle 30 is fastened to base 24 in a top hinged configuration, the receptacle will tend to be gravity latched. In other words, gravity will tend to cause the receptacle to maintain a closed position.

Base 24 has a concave lip 36 extending about its periphery and generally conforming to the edges of receptacle 30, which lip 36 provides a dual function. First, the lip provides for better closure between the receptacle and base to prevent cut grass clippings or other vegetation collected in the receptacle from escaping therefrom when the receptacle is closed. Secondly, the portion of the lip at the top of the base may function, together with other elements, as a hinged connection between the receptacle and the mower. As shown most clearly in FIG. 3, receptacle 30 has a convex lip 38 therein about its edge which mates with lip 36 of base 24 to seal the receptacle and form an effective clipping collecting enclosure. In the embodiment shown in the drawings, receptacle 30 is generally trapezoidal in vertical cross-section. This shape is advantageous as it makes the receptacle less susceptible to packing of clippings in the corners and renders it easier to fabricate. Receptacle 30 is formed by means of top and bottom walls 40 and 42 respectively joined by opposed side walls 44 and 46 and a rear wall 48 to form a clipping collecting enclosure. One edge of top wall 40 is hingedly fastened to base 24 by means of cooperating lips 36 and 38 and a tubular rod member 50 fastened to lip 36 by means of screws 52 as shown in the enlarged sectional view of FIG. 6. Clearance slots for screws 52 are provided in lip 38 along the edge of top wall 40 to allow the receptacle 30 to pivot about an axis defined by member 50, which functions as a hinge pin for the hinge connection between the base and receptacle. While it will be apparent to those of skill in the art that other hinge connections would be usable in connection with the present invention, the illustrated hinged connection is particularly advantageous in that it makes use of the sealing lips between the receptacle and base to function as a portion of the hinge structure.

Since it may be desirable to use the mower 10 in a side discharge mode in which cut grass clippings are discharged to the side of housing 18 rather than collected in a receptacle, base 24 is removably fastened to main frame 16 by means of apertured brackets 52 and 54, as shown particularly in FIG. 3. These brackets fit over three mounting pins 56 for ease in assembly and removal. As shown particularly in the sectional view of FIG. 4, one or more of mounting pins 56 may be provided with a spring wire keeper 60 which fits into a peripheral groove in the mounting pin to secure the base bracket to the main frame.

Receptacle or basket 30 carries an elongated handle member generally designated 64. In the embodiment shown, elongated handle member 64 has an enlarged grip portion 66 at one end thereof which protrudes from top wall 40 of receptacle or basket 30. Basket 30 has, in the embodiment shown, a structural brace member 68 fastened between top wall 40 and side wall 44 by means of screws, bolts or other suitable connection. Elongated handle member 64 is telescopically mounted to receptacle 30 by means of a pair of aligned apertures 70 and 72 sized to receive the handle member. Aperture 70 is a clearance hole formed in top wall 40, while aperture 72 is a clearance hole formed in the structure of the brace member. Handle member 64 may be a tubular rod-like member constructed of tubular aluminum or other suitable structural material. In the embodiment pictured, the member is circular in cross-section and therefore apertures 70 and 72 are likewise circular apertures.

As will be apparent from the description, handle member 64 in its retracted position has only a small portion, its grip portion, extending outwardly from the receptacle. Therefore, the handle is compactly stored. When emptying of the receptacle is desired, an operator need merely reach back, lift the handle to cause it to move from its retracted position to a position of extension shown in phantom in FIG. 3, and, using the handle as a lever, pivot receptacle 30 about its top hinge to empty it. The forces exerted on the handle by the operator are transmitted by means of the telescopic connection between the handle member and brace member 68 and top wall 40 to the receptacle to pivot it.

It is advantageous to provide the handle member with a stop means to prevent it from being fully withdrawn from the telescopic connection. In the embodiment shown this stop means comprises a bolt 80 fastened near the end of handle member 64 opposite grip portion 66. When the handle is fully extended, stop means or bolt 80 bears against brace member 68 and will not pass through the aperture 72.

In addition to functioning as a readily extensible and retractable handle for convenient emptying of the receptacle, handle member 64 cooperates with a bracket means 84 to function as a latch to prevent accidental opening of the enclosure defined by the receptacle and its baseboard. Bracket 84 may be a U-shaped bracket or any suitably apertured bracket means which may engage a portion of handle member 64 when it is in its retracted position. A particular convenient bracket means is the U-shaped bracket 84 shown in the drawings which is fastened by means of a bolted connection to base 24. With such a construction when the operator lifts the handle in preparation for using it as a pivot lever to empty the receptacle, he is simultaneously unlatching the apparatus to allow pivotal opening.

It will be apparent to those of skill in the art that a number of alternatives and modifications within the scope of the present invention might be made. For example, other means for telescopically mounting the handle to allow movement between a retracted and extended position might be provided. One alternative might be to provide exterior brackets with aligned apertures at one side of the receptacle. Similarly, it is not necessary to have a U-shaped bracket to function as a latch means for the receptacle. Any latch which functions as a result of the extension and retraction of the handle might be acceptable. These and other alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. In a lawn and garden implement in which vegetation is transported to and collected in a receptacle with a substantially rigid, boxlike structure enclosed by top and bottom walls, opposed side walls and a rear wall, said receptacle being hingedly fastened to an implement main frame along an edge of said top wall to permit said receptacle to pivot about a substantially horizontal axis and close against a receptacle base mounted on said main frame, a handle and latch mechanism, comprising:
   a. means defining an elongated handle member;
   b. means for telescopically mounting said handle member in said receptacle with a portion thereof protruding through an aperture in said top wall so that said handle member is upwardly extensible therefrom to function as a lever for pivotal emptying of said receptacle, and downwardly retractable into a handle storage position; and
   c. apertured latch means carried by said implement main frame for receiving one end of said handle in an aperture thereof when said handle member is in said storage position.

2. The structure of claim 1 wherein said means for telescopically mounting includes an aperture in a substantially rigid portion of said receptacle, and an angular structural brace member fastened between two walls of said receptacle with an aperture therein aligned with said receptacle aperture to receive said handle member therethrough.

3. The structure of claim 2, and stop means carried by said handle and engageable with said structural brace member to prevent upward extension of said handle member from causing disengagement of said handle from said receptacle.

4. The structure of claim 3 wherein said receptacle base is mounted on said main frame at an acute angle with the vertical to facilitate closure of said receptacle.

5. The structure of claim 1 wherein said handle member is a rodlike member of substantially circular cross-section having a longitudinal axis, and said apertured latch means is a U-shaped bracket substantially aligned with the axis of said handle member to receive the end thereof and secure said receptacle when said handle member is in said storage position.

6. The structure of claim 5 wherein said receptacle is formed of substantially rigid molded plastic provided with vented portions therein to allow discharge of air while retaining grass clippings, said top wall has a convex lip formed along the edge thereof, said base has a concave lip proximate its top edge which mates with said convex lip in assembly, and a rod member of circular cross-section is fastened to save concave lip to function as a hinge pin to allow pivotal movement of said receptacle with respect to said base.

7. Collecting and unloading apparatus for a riding-type lawn mower in which an operator and rotary cutting element may be supported, above a ground surface to be mowed, on a main frame by means of ground engaging wheels, said mower including a housing surrounding said cutting element, with a discharge chute connected thereto and leading from said housing to a chute opening in a substantially planar baseboard mounted on said main frame, comprising:
   a. basket means defining a receptacle of substantial structural rigidity;
   b. hinge means fastening said basket means to said baseboard to form a collecting enclosure;
   c. means defining an elongated handle member carried by said basket means and so mounted to be movable from a first retracted position to a second extended position to facilitate pivoting of said basket means about an axis defined by said hinge means for emptying of said basket means; and
   d. bracket means carried by said main frame, being engaged with said handle member in said first, retracted position to prevent pivoting of said basket means, and disengaged from said handle member when said handle member is in said second, extended position to permit pivotal movement of said basket means.

8. The structure of claim 7 wherein said handle comprises a unitary tubular member with a grip portion at one end thereof, and the structure further includes a structural brace member within said basket means, said basket means and said structural brace member having aligned holes therein to receive said tubular member therethrough.

9. The structure of claim 8 further including stop means on the end of said tubular member opposite said grip member to prevent said tubular member from being fully withdrawn from said basket means.

10. The structure of claim 9 wherein said grip portion is of diameter greater than said aperture in said basket means to prevent said tubular member from passing through the aperture in said basket means.

11. The structure of claim 10 wherein said baseboard is mounted at an acute angle with respect to the vertical, and includes a concave lip thereon conforming generally to the shape of the edge of said basket means for sealing thereof.

12. The structure of claim 11 wherein said basket means is formed of substantially rigid plastic material with vented portions therein, and has a cross-section taken perpendicular to said baseboard which is generally trapezoidal.

* * * * *